United States Patent
Takano et al.

(10) Patent No.: US 7,937,766 B2
(45) Date of Patent: May 3, 2011

(54) METHOD AND SYSTEM FOR PREVENTING SIMULTANEOUS USE OF CONTENTS IN DIFFERENT FORMATS DERIVED FROM THE SAME CONTENT AT A PLURALITY OF PLACES

(75) Inventors: Haruko Takano, Yokohama (JP); Yukihide Inagaki, Fujisawa (JP); Shuichi Miyazaki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1000 days.

(21) Appl. No.: 11/698,075

(22) Filed: Jan. 26, 2007

(65) Prior Publication Data

US 2007/0192790 A1 Aug. 16, 2007

(30) Foreign Application Priority Data

Jan. 27, 2006 (JP) ................................. 2006-019233

(51) Int. Cl.
G06F 7/04 (2006.01)
(52) U.S. Cl. ............... 726/30; 726/29; 726/31; 713/193
(58) Field of Classification Search .................. 380/228, 380/277; 713/193, 189; 705/58, 59; 726/26, 726/28–33

See application file for complete search history.

(56) References Cited

U.S. PATENT DOCUMENTS

| | | | | |
|---|---|---|---|---|
| 2002/0057799 A1 * | 5/2002 | Kohno | ........................... | 380/228 |
| 2003/0123347 A1 | 7/2003 | Saito | | |
| 2004/0068483 A1 | 4/2004 | Sakurai et al. | | |
| 2004/0078066 A1 * | 4/2004 | Ohta et al. | ........................ | 607/60 |
| 2004/0179691 A1 * | 9/2004 | Hori et al. | ...................... | 380/277 |
| 2005/0149751 A1 | 7/2005 | Ochi et al. | | |
| 2007/0276760 A1 * | 11/2007 | Kanehara et al. | ............... | 705/59 |
| 2007/0288386 A1 * | 12/2007 | Adachi et al. | ................... | 705/58 |

FOREIGN PATENT DOCUMENTS

| | | |
|---|---|---|
| JP | 2000-010778 | 1/2000 |
| JP | 2000173182 | 6/2000 |
| JP | 2002236808 | 8/2002 |
| JP | 2003179852 | 6/2003 |
| JP | 2003224822 | 8/2003 |
| JP | 2005166168 | 6/2005 |
| JP | 2005174180 | 6/2005 |
| JP | 2005182906 | 7/2005 |
| WO | 02056312 | 7/2002 |

OTHER PUBLICATIONS

Japanese Office Action issued Apr. 20, 2010 in corresponding Japanese Patent Application No. 2006-019233 along with English language translation.

* cited by examiner

*Primary Examiner* — Edward Zee (74) *Attorney, Agent, or Firm* — Brundidge & Stanger, P.C.

(57) ABSTRACT

The original content and the converted content obtained by converting the original content are encrypted by the same content key. A license containing data of use conditions such as the content key and a use period is recorded in an area of a storage medium limited for access. When the converted content is used with an external storage medium, a copy of an original license is created, a use period of the copy is changed to a use period of the converted content designated by a user, and the license is output as a converted content license to the external storage device. The use period of the original content is rewritten to prevent its overlapping with a use period defined by the converted license.

17 Claims, 6 Drawing Sheets

METHOD AND SYSTEM FOR PREVENTING SIMULTANEOUS USE OF CONTENTS IN DIFFERENT FORMATS DERIVED FROM THE SAME CONTENT AT A PLURALITY OF PLACES

CLAIM OF PRIORITY

The present application claims priority from Japanese application JP2006-19233 filed on Jan. 27, 2006, the content of which is hereby incorporated by reference into this application.

BACKGROUND OF THE INVENTION

1. Field of the Invention

This invention relates to an information processor, an information recording medium, an information processing method, and a computer program, and more particularly to a copyright management using the above-mentioned information processor and the like.

2. Related Background Art

Digital high-definition broadcasting has started, and high-definition compatible television receivers and players have started to gain in popularity. It can be expected accordingly that high-definition broadcast contents and video contents will be mainly distributed in the future.

While distribution of high-definition contents is expanding, a standard-definition player frequently used at present inhibits watching of high-definition contents because of lack of its processing capacity. To use the high-definition contents with the standard-definition player, the high-definition contents must be converted into standard-definition contents. However, permission of the conversion process without any restrictions will lead to copyright infringement of contents such as illegal duplication.

JP 2000-10778 A discloses a method to solve the problem. According to the method of JP 2000-10778 A, copyright condition data and copyright history data are generated to enable generation of a royalty on each of first-order, second-order, ... and an nth-order changes of digital contents. By circulating the changed digital contents together with a change license user condition statement which incorporates the copyright condition data and the copyright history data, royalties on the changed digital contents are managed.

SUMMARY OF THE INVENTION

According to the method of JP 2000-10778 A, original data is not left after the original data is subjected to quality or format conversion process for temporary use. Thus, it is impossible to restore the original data unconverted. For example, when content quality is converted into standard quality to use high-definition-recorded contents with a standard-definition compatible player, original data cannot be restored from the standard-definition contents to be watched in high definition.

According to a representative invention disclosed in this application, there is provided a storage device for recording contents, comprising: a first storage area in which the contents are recorded; and a second storage area limited for access, wherein: a first encrypted content obtained by encrypting a first content by using a predetermined encryption key, and a second encrypted content obtained by encrypting a second content, which is generated by executing a predetermined conversion process for the first content, by the encryption key used for encrypting the first content are recorded in the first storage area; first license information regarding the first content and the second content being recorded in the second storage area; the first license information containing use period information indicating a use period to permit use of one of the first content and the second content, and an encryption key for decrypting the first encrypted content and the second encrypted content; the storage device generates, upon acquisition of the use period of the second content, second license information which is a copy of the first license information; the storage device changes use period information contained in one of the first license information and the second license information to the obtained use period; the storage device outputs license information containing the changed use period information; and the storage device deletes the use period contained in the output license information from use period information contained in the other of the first license information and the second license information.

According to an embodiment of this invention, it is possible to protect a copyright by preventing simultaneous use of an original content and a converted content derived from the original contents at difference places. Even after creation of the converted content, the original content can be left. Even if an external storage device in which the converted content has been recorded is not at hand, the original content can be used after an expiration date for use of the converted content. Moreover, converted content can be created again from the original content.

DETAILED DESCRIPTION OF THE PREFERRED EMBODIMENTS

Referring to the drawings, preferred embodiments of this invention will be described below.

Figure 2:
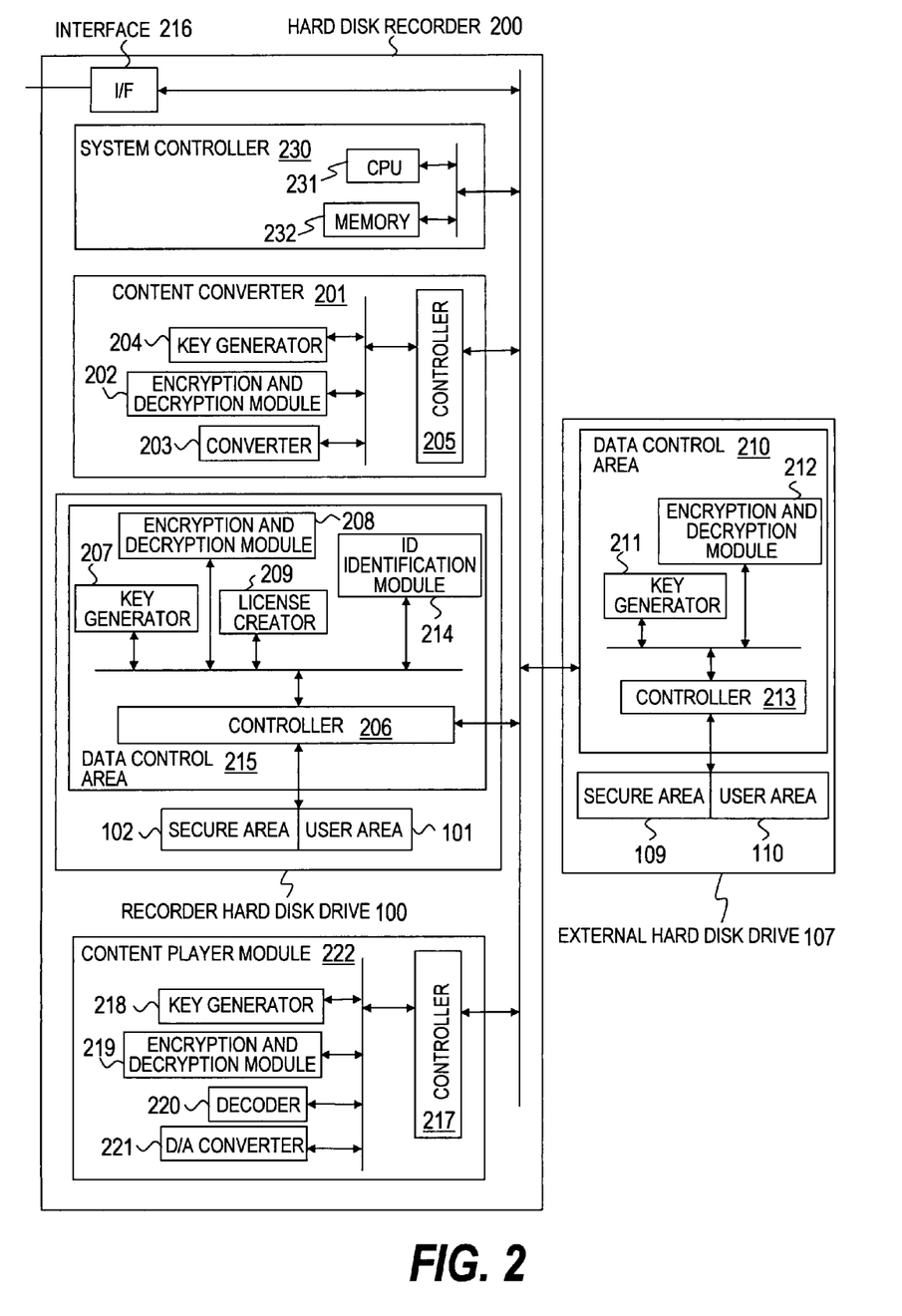
FIG. 2 is an explanatory diagram showing an outline of a system to which this invention is applied.

FIG. 2 is an explanatory diagram showing an outline of a system to which this invention is applied.

A hard disk recorder 200 is a terminal device which includes a recorder hard disk drive 100, a content converter 201, an interface 216, a content player module 222, and a system controller 230, and manages contents. The hard disk recorder 200 writes contents in the recorder hard disk drive 100, or reads contents from the recorder hard disk drive 100 in response to a request from a user. Additionally, the hard disk recorder 200 can write contents in a connected external hard disk drive described below.

The recorder hard disk drive 100 is a storage device which includes a secure area 102, a user area 101, and a data control area 215, and records the contents written with the hard disk recorder 200.

The secure area 102 is an area limited for access and disposed in a storage medium (not shown) of the recorder hard disk drive 100.

The user area 101 is an area not limited for access (i.e., freely accessed by the user) and disposed in the storage medium of the recorder hard disk drive 100.

Figure 4:
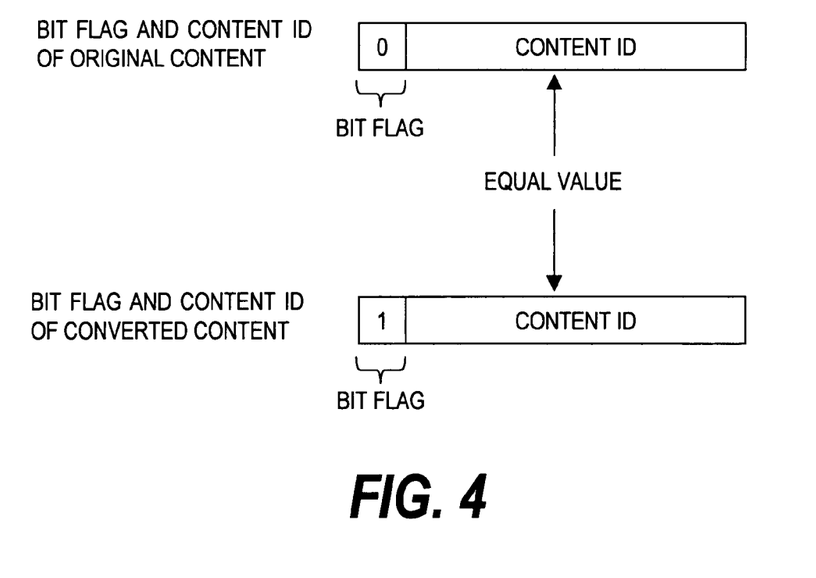
FIG. 4 is an explanatory diagram showing a content ID according to the embodiment of this invention.

The data control area 215 is a secure module which includes a key generator 207 for generating keys, an encryption and decryption module 208 for executing encryption and decryption, a license creator 209 for creating a converted license based on an original license, an ID identification module 214 for identifying a bit flag added to a content ID, and a controller 206 for controlling an overall process of those units. For example, the secure module is a module realized by a structure in which an area to be secured is sealed with a resin and a circuit is destroyed if the resin is removed. Referring to FIG. 4, the content ID and the bit flag will be described below in detail.

The content converter 201 is a secure module which includes a key generator 204 for generating keys, an encryption and decryption module 202 for executing encryption and decryption, a converter 203 for executing a conversion process such as an original content compression, and a controller 205 for controlling an overall process of those units.

The content player module 222 is a secure module which includes a key generator 218 for generating keys, an encryption and decryption module 219 for executing encryption and decryption, a decoder 220 for decoding data, and a digital/analog (D/A) converter 221 for executing a digital/analog conversion process.

The external hard disk drive 107 is a storage device which includes a secure area 109, a user area 110, and a data control area 210.

The secure area 109 is an area limited for access and disposed in a storage medium (not shown) of the external hard disk drive 107.

The user area 110 is an area freely accessed by the user and disposed in the storage medium of the external hard disk drive 107.

The external hard disk drive 107 of this embodiment is a removable hard disk drive. For example, the external hard disk drive 107 of this embodiment may be an information versatile disk for removable usage (iVDR). This embodiment will be described by way of an example in which the external hard disk drive 107 is an iVDR. It should be noted, however, that this embodiment can be realized even when the external hard disk drive 107 is a removable medium other than the iVDR.

For example, by copying or moving contents recorded in the recorder hard disk drive 100 to the external hard disk drive 107 and connecting the external hard disk drive 107 to another terminal device, the user can use the contents by using the terminal device. The use of contents refers to watching or listening to the contents when the contents are videos or music.

The recorder hard disk drive 100 of this embodiment is a hard disk drive incorporated in a hard disk recorder 200. It should be noted, however, that this embodiment can be realized even when the recorder hard disk drive 100 is a removable medium such as an iVDR. When the recorder hard disk drive 100 is a removable medium, by connecting the recorder hard disk drive 100 to another terminal device, the user can utilize contents by using the terminal device.

The data control area 210 includes a key generator 211 for generating keys, an encryption and decryption module 212 for executing encryption and decryption, and a controller 213 for controlling an overall process of those units.

The interface 216 has, for example, an I/O function composed of a switch or a keyboard operated by the user, a communication function for making a connection to a network by a LAN cable or wireless, and the like.

The system controller 230 is a controller for controlling the entire hard disk recorder 200. The system controller 230 includes a CPU 231 and a memory 232. The CPU 231 is a processor for executing programs (not shown) stored in the memory 232. The memory 232 stores the programs executed by the CPU 231 and other data (not shown). In the description below, a process executed by the system controller 230 is actually executed by the CPU 231 of the system controller 230.

Next, referring to FIGS. 1 to 4, an outline of this invention will be described.

Figure 1:
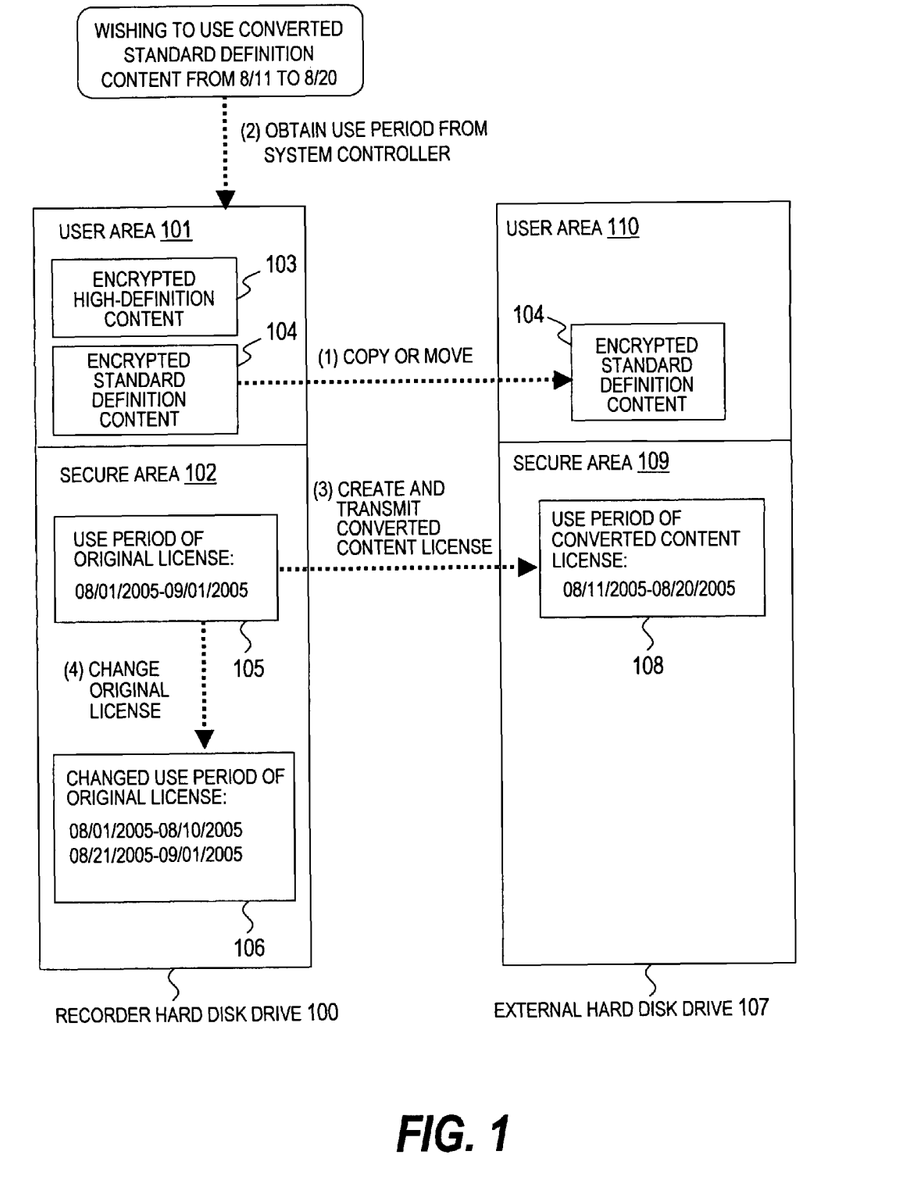
FIG. 1 is an explanatory diagram showing an outline of a process according to an embodiment of this invention.

FIG. 1 is an explanatory diagram of an outline of a process according to the embodiment of this invention.

The recorder hard disk drive 100 is a hard disk drive incorporated in the hard disk recorder 200 of FIG. 2. The recorder hard disk drive 100 includes the secure area 102 limited for access, and the user area 101 that can be freely accessed by the user.

Figure 7:
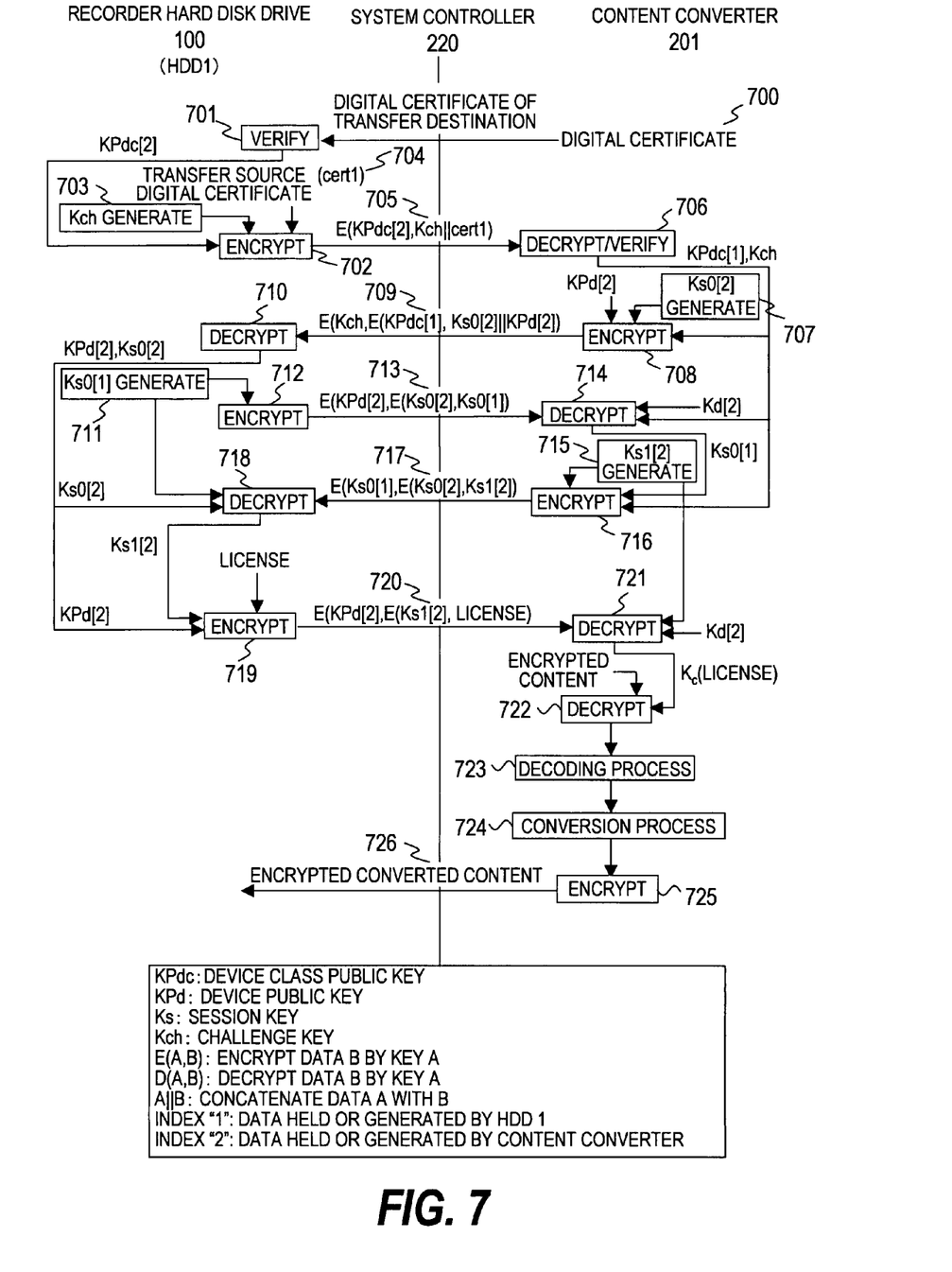
FIG. 7 is a flowchart showing a procedure where the recorder hard disk drive generates a converted content according to the embodiment of this invention.

A high-definition content 103 which is an original content and a standard-definition content 104 which is a converted content created by converting the original content 103 are recorded in encrypted states in the user area 101. The encrypted standard-definition content 104 is a content created in such a manner that the encryption and decryption module 202 first decrypts the encrypted high-definition content 103, the converter 203 converts the high-definition content 103 into a standard-definition content, and the standard-definition content is encrypted by using the same encryption key as that used by the encryption and decryption module 202 to encrypt the encrypted high-definition content 103. Referring to FIG. 7, a procedure of creating the encrypted standard-definition content 104 will be described below in detail.

A content recorded in the user area is identified by a content ID corresponding to each content. As shown in FIG. 4, the content ID is assigned with a bit flag for identifying which of the original content the converted content has been derived from. In an example of FIG. 4, the bit flag is a bit added to a head of the content ID, and indicates whether the content identified by the content ID with the bit flag has been converted. In the example of FIG. 4, a value of a bit flag of the converted content is "1", while a value of a bit flag of the original content (i.e., content which has not been converted) is "0". On the other hand, values of content ID's of the original content and the converted content derived from the original content are equal to each other. The content ID and the bit flag are included in both of the content itself and a license regarding the content.

FIG. 4 shows a bit flag of 1 bit. According to this embodiment, however, the bit flag may include 2 or more bits. For example, when a plurality of converted contents are generated from one original content by different conversion methods, bit flags of the plurality of converted contents take values different from one another. For example, in the case of a bit flag of 2 bits, a value of a bit flag of an original content may be "00", and values of bit flags of first and second converted contents derived from the original content may respectively be "01" and "10".

An original license 105 corresponding to the encrypted content recorded in the user area 101 is recorded in the secure area 102. The original license 105 contains at least a content key for decrypting the encrypted high-definition content 103 and the encrypted standard-definition content 104, and a use period (i.e., information indicating a permitted use period of the contents).

An outline of a process of this embodiment will be described by taking a specific example.

The encrypted high-definition content 103 and the encrypted standard-definition content 104 are recorded in the user area 101 of the recorder hard disk drive 100. The original license 105 is recorded in the secure area 102. In the example of FIG. 1, a use period included in the original license 105 is "08/01/2005 to 09/01/2005". This indicates during the period from Aug. 1, 2005 to Sep. 1, 2005, the user is permitted to use the encrypted high-definition content 103 and the encrypted standard-definition content 104.

The user can freely copy or move the encrypted contents. In the example of FIG. 1, the user copies or moves the encrypted standard-definition content 104 to the user area 110 of the external hard disk drive 107 (1). At this point, as there is no license of the encrypted standard-definition content 104 in the external hard disk drive 107, the user cannot use the encrypted standard-definition content 104 of the external hard disk drive 107.

Then, the recorder hard disk drive 100 receives and obtains a use period from the system controller 230 (2). For example, when the user wishes to use the encrypted standard-definition content 104 of the external hard disk drive 107 from Aug. 11, 2005 to Aug. 20, 2005, the user may input the period to the system controller 230.

The recorder hard disk drive 100 creates a converted content license (i.e., a license for a converted content) 108 based on the original license 105 to transmit the converted content license 108 to the external hard disk drive 107 (3). Specifically, the converted content license 108 is created by creating a copy of the original license 105 and changing a use period of the copy. In the example of FIG. 1, a use period included in the converted content license 108 is "08/11/2005 to 08/20/2005". The transmitted converted content license 108 is recorded in the secure area 109 of the external hard disk drive 107.

The recorder hard disk drive 100 changes the original license 105 such that the use period of the original license 105 does not overlap that of the converted content license 108 (4). Specifically, the recorder hard disk drive 100 deletes the use period of the converted content license 108 from the use period of the original license 105. In the example of FIG. 1, the recorder hard disk drive 100 creates a changed original license 106 by changing the use period of the original license 105 to "08/01/2005 to 08/10/2005, 08/21/2005 to 09/01/2005".

In the example of FIG. 1, the converted content license 108 is created by changing the use period of the copy of the original license 105, and the changed original license 106 is created by changing the use period of the original license 105. However, the changed original license 106 may be created by changing the use period of the copy of the original license 105, and the converted content license 108 may be created by changing the use period of the original license 105.

To prevent overlapping of use periods, the processes (3) and (4) are preferably executed simultaneously.

As a result, the user can use the encrypted high-definition content 103 or the encrypted standard-definition content 104 of the recorder hard disk drive 100 from Aug. 1, 2005 to Aug. 10, 2005 and from Aug. 21, 2005 to Sep. 1, 2005. On the other hand, from Aug. 11, 2005 to Aug. 20, 2005, the user can use the encrypted standard-definition content 104 of the external hard disk drive 107.

Thus, as the use periods are set not to overlap each other, simultaneous use of a plurality of contents derived from one content at a plurality of places can be prevented. As a result, a copyright of the contents can be protected.

Figure 3:
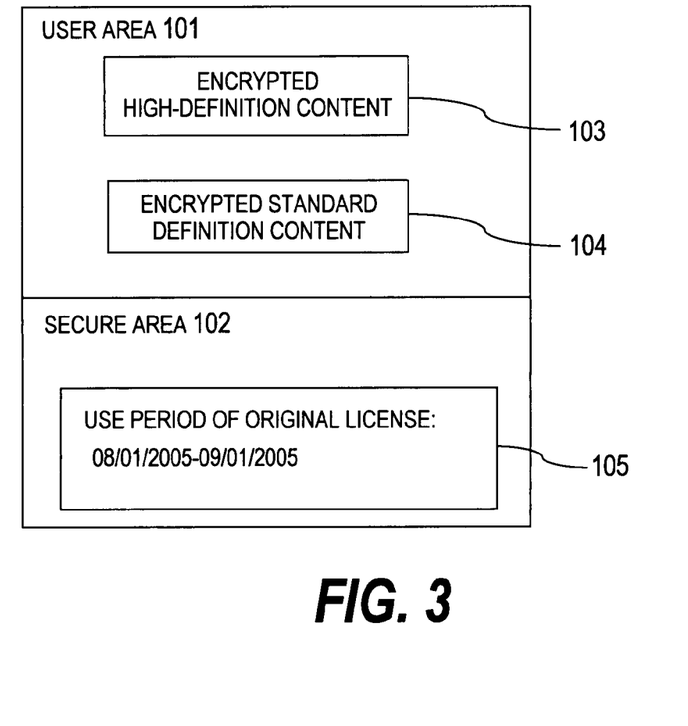
FIG. 3 is an explanatory diagram of a case where an original content and a converted content are in one and the same storage medium according to the embodiment of this invention.

As shown in FIG. 3, when the encrypted high-definition content 103 and the encrypted standard-definition content 104 are recorded in the same storage medium, the encrypted high-definition content 103 and the encrypted standard-definition content 104 correspond to the original license 105.

When the recorder hard disk drive 100 is connected to a player terminal (e.g., hard disk recorder 200), the system controller 230 selects a content of a file format suited to the player terminal, and decrypts the selected content of the file format by a content key of the original license.

Next, referring to FIG. 5, a case of moving or copying the encrypted standard-definition content 104 from the recorder hard disk drive 100 to use it in the external hard disk drive 107 as shown in FIG. 1 will be described.

Figure 5:
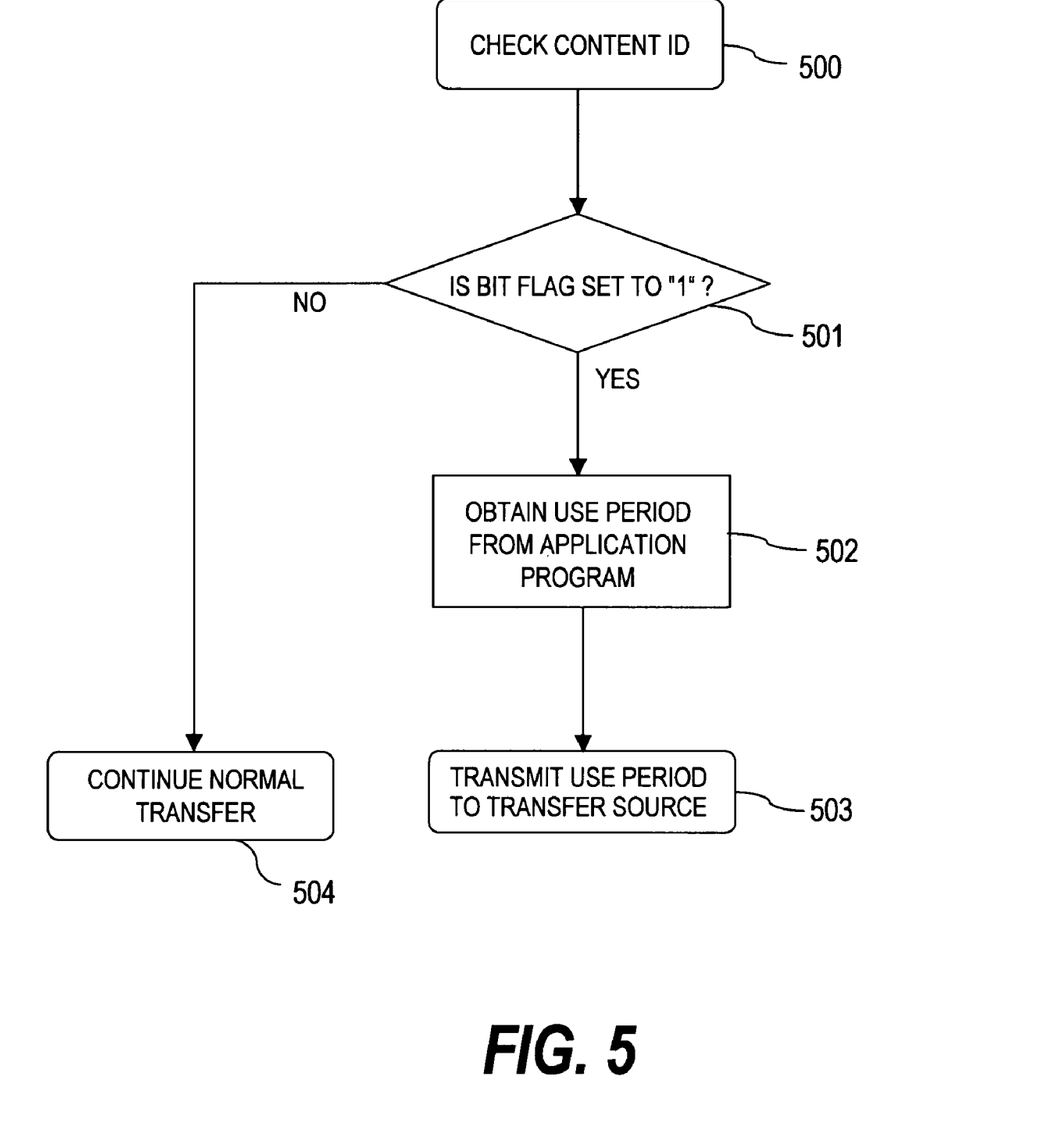
FIG. 5 is a flowchart of a process in which a system controller checks a bit flag according to the embodiment of this invention.

FIG. 5 is a flowchart of a process in which the system controller 230 checks the bit flag according to the embodiment of this invention.

When the encrypted standard-definition content 104 is to be moved or copied from the recorder hard disk drive 100 and a converted content license for the encrypted standard-definition content is to be obtained, the system controller 230 connected to the recorder hard disk drive 100 checks a content ID of the content to be taken out (500), and checks whether a bit flag is set to 1 (501). For example, the user of the hard disk recorder 200 may input or transmit a content ID for identifying the encrypted standard-definition content to be copied from the recorder hard disk drive 100 to the external hard disk drive 107 and a bit flag added to the content ID to the system controller 230. In this case, the system controller 230 obtains the content ID and the bit flag added to the content ID from the user.

When it is judged in the step 501 that a bit flag is not set to 1 (e.g., a value of the bit flag shown in FIG. 4 is "0"), the system controller 230 continues normal license transfer (504). On the other hand, when it is judged that a bit flag is set to 1 (e.g., a value of the bit flag shown in FIG. 4 is "1"), the system controller 230 requests the user to input a use period of the encrypted standard-definition content via an application program (not shown) (502). Then, the content use period obtained from the user via the application program is transmitted to the recorder hard disk drive 100 (503). The process of the step 503 corresponds to (2) of FIG. 1. In FIG. 1, the recorder hard disk drive 100 that has obtained the content use period from the system controller 230 generates a converted license for outputting based on the obtained use period, and transmits the converted license to the external hard disk drive 107 as indicated by (3) of FIG. 1.

Figure 6:
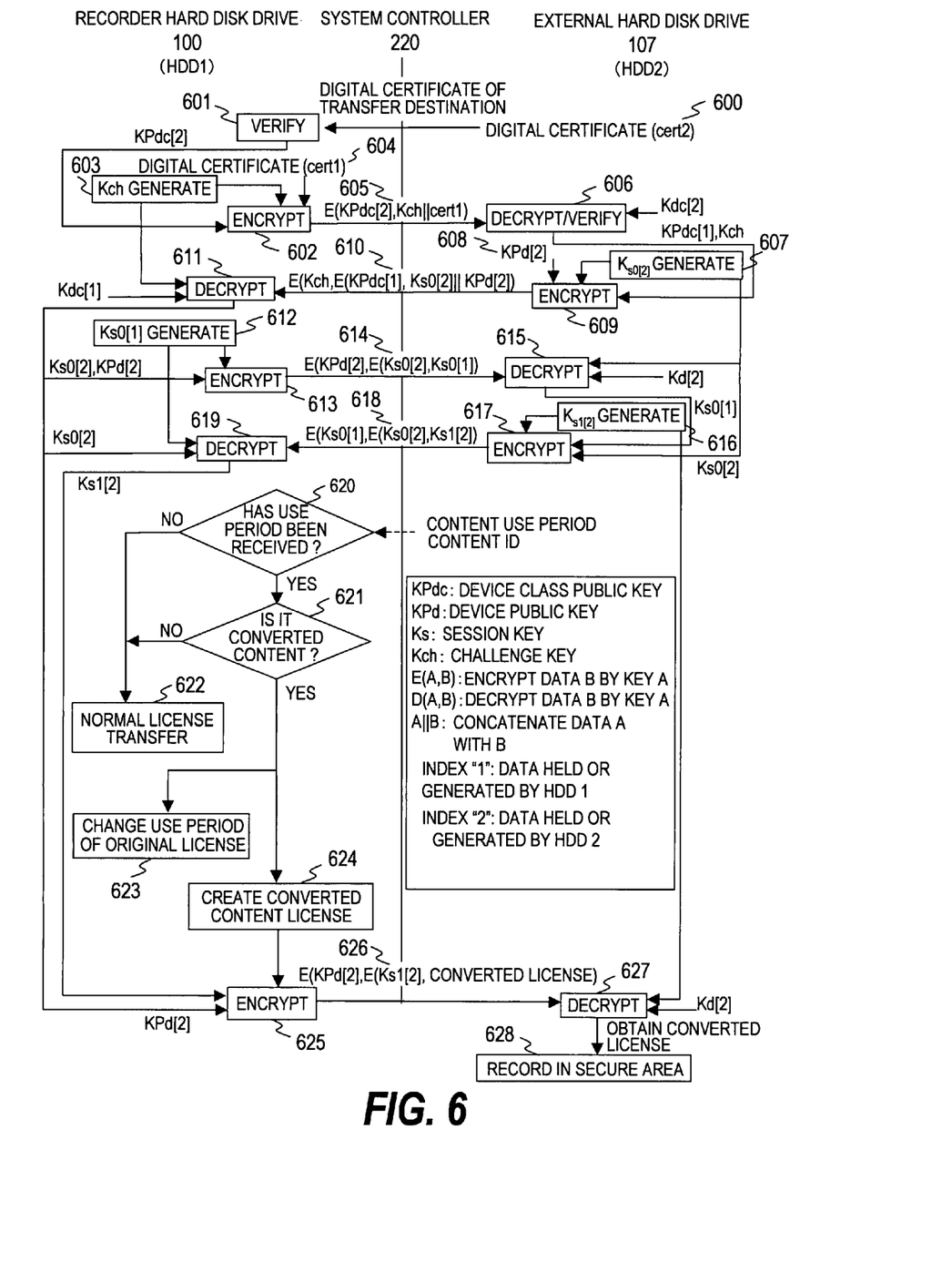
FIG. 6 is a flowchart showing a procedure in which a recorder hard disk drive generates a converted license for a converted content according to the embodiment of this invention.

FIG. 6 is a flowchart showing a procedure in which the recorder hard disk drive 100 generates a converted license of the converted content according to the embodiment of this invention. The converted content of FIG. 6 corresponds to the encrypted standard-definition content 104 of FIG. 1.

In the description below, the recorder hard disk drive 100 will be referred to as HDD 1, and the external hard disk drive 107 will be referred to as HDD 2. It is presumed that in nonvolatile memories (not shown) of the HDD 1 and the HDD 2, a device class public key (KPdc), a device class private key (Kdc), a device public key (KPd), a device private key (Kd), and digital certificates (cert 1 and cert 2) are recorded during manufacturing. This similarly applies to FIG. 7. In FIG. 6, an index "1" is added to data held in the HDD 1 or data generated by the HDD 1. An index "2" is added to data held by the HDD 2 or data generated by the HDD 2.

In the description below, communication between the HDD 1 and the HDD 2 is actually executed via the system controller 230.

First, the HDD 2 transfers a digital certificate 600 for validating the HDD 2 to the HDD 1.

The HDD 1 verifies the received digital certificate (601), and accordingly obtains a device class public key KPdc "2" of the HDD 2. Then, the HDD 1 generate a challenge key Kch which is a temporary key by the key generator 207 (603). The HDD 1 encrypts data in which the generated challenge key Kch is concatenated with its own digital certificate 604 by the device class public key KPdc "2" of the HDD 2 (602), and transmits the encrypted data 605 to the HDD 2.

The HDD 2 that has received the data 605 transmitted from the HDD 1 decrypts the received data 605 by a device class private key Kdc "2" held in advance, and obtains the challenge key Kch generated by the HDD 1 and the digital certificate 604 of the HDD 1(606). The HDD 2 verifies the obtained digital certificate 604 (606), and obtains a device class public key KPdc "1" of the HDD 1. The HDD 2 generates a session key Ks0 "2" which is a temporary key by the key generator 211 (607). Then, the HDD 2 dually encrypts data in which the generated session key Ks0 "2" is concatenated with a device public key KPd "2" of the HDD 2 (608) by using the device class public key KPdc "1" of the HDD 1 and the challenge key Kch generated by the HDD 1 (609), and transmits the encrypted data 610 to the HDD 1.

The HDD 1 decrypts the received data 610 (611) to obtain the device public key KPd "2" of the HDD 2 and the session key Ks0 "2" generated by the HDD 2. The HDD 1 generates a session key Ks0 "1" which is a temporary key by the key generator 207 (612). Then, the HDD 1 dually encrypts the generated session key Ks0 "1" by using the session key Ks0 "2" generated by the HDD 2 and the device public key KPd "2" of the HDD 2 (613), and transmits the encrypted data 614 to the HDD 2.

The HDD 2 decrypts the received data 614 by the device private key Kd "2" of its own and the session key Ks0 "2" (615) to obtain the session key Ks0 "1" generated by the HDD 1. Then, the HDD 2 generates a session key Ks1 "2" by the key generator 211 (616). The HDD 2 dually encrypts the session key Ks1 "2" by using the obtained session key Ks0 "1" and the session key Ks0 "2" which the HDD 2 has created last time, and transmits the encrypted data 618 to the HDD 1.

The HDD 1 decrypts the received (obtained) data 618 (619) to obtain the session key Ks1 "2". Then, upon reception of a content ID and a content use period from the system controller 230 (620), the HDD 1 judges whether the content ID is an ID for a converted content by the ID identification module 214 (621). On the other hand, when the HDD 1 has not received the content ID and the use period from the system controller 230 (620), and when the content ID received by the HDD 1 is not an ID for the converted content (621), the process proceeds to normal license transfer shown in FIG. 7 (622).

When the content ID received by the HDD 1 is an ID for the converted content (621), the HDD 1 creates a converted license (624). Specifically, the HDD 1 creates a copy of an original license and changes a use period of the copy of the original license (08/01/2005 to 09/01/2005 in the example of FIG. 1) to a content use period obtained from the system controller 230 (08/11/2005 to 08/20/2005 in the example of FIG. 1).

Simultaneously with the step 624, the HDD 1 changes the use period of the original license (623). Specifically, the HDD 1 deletes the use period received from the system controller 230 from that of the original license to prevent overlapping of the use period of the original license with the content use period obtained from the system controller 230. In the example of FIG. 1, the HDD 1 changes the use period of the original license to 08/01/2005 to 08/10/2005 and 08/21/2005 to 09/01/2005 (623).

Then, the HDD 1 encrypts the converted license thus created by using the session key Ks1 "2" obtained in the step 619 and the device public key KPd "2" of the HDD 2 (625), and transmits the encrypted data 626 to the HDD 2. Specifically, the HDD 1 transmits (outputs) the encrypted data 626 to the system controller 230. The system controller 230 transmits the encrypted data 626 received from the HDD 1 to the HDD 2. The HDD 2 that has received the data 626 decrypts the data 626 by using the device private key Kd "2" and the session key Ks1 "2" of its own (627) to obtain a converted license.

The HDD 2 that has obtained the converted license decrypts the encrypted standard-definition content by using the converted license when the encrypted standard-definition content 104 obtained from the HDD 1 is watched. After 08/20/2005 which is an expiration date a use period of the converted license, the standard-definition content cannot be decrypted, thus disabling watching. On the other hand, while the original content cannot be watched during the period from 08/11/2005 to 08/20/2005, the original content can be watched after 08/20/2005.

According to this embodiment, when the use period of the converted content obtained from the system controller 230 is 08/11/2005 to 08/20/2005, the use period of the original license is changed to 08/01/2005 to 08/10/2005 and 08/21/2005 to 09/01/2005 to prevent overlapping with the use period of the converted content (623). However, instead of changing the use period of the original license in the aforementioned manner, two types of original licenses respectively having a use period of 08/01/2005 to 08/10/2005 and 08/21/2005 to 09/01/2005 may be created. In this case, during content use, a usable license whose expiration date has not passed is selected.

Next, description will be made of a method by which the content converter 201 of the hard disk recorder 200 safely converts the encrypted original content recorded in the user area 101 of the recorder hard disk drive 100 without the content being subjected to illegal use such as illegal copying or alteration. The conversion process in this case refers to a conversion process that can be executed by the content converter 201, e.g., a conversion process of a compression method or a conversion process of an image format.

An outline of a process will be described. First, the system controller 230 creates a copy of the encrypted original content to transmit the copy to the content converter 201. Then, the system controller 230 copies the original license recorded in the secure area 102, and transmits the copy to the content converter 201 by the procedure shown in FIG. 7. The data to be transmitted may not be in a license format as long as it contains a content key. Referring to FIG. 7, a license transfer method will be described below in detail.

FIG. 7 is a flowchart showing the procedure through which the recorder hard disk drive 100 generates a converted content according to the embodiment of this invention.

In FIG. 7, an index "1" is added to data held by the HDD 1 or data generated by the HDD 1. On the other hand, an index "2" is added to data held by the content converter 201 or data generated by the content converter 201.

First, the content converter 201 transfers a digital certificate 700 for validating the content converter 201 to the recorder hard disk drive 100 (referred to as HDD 1 hereinafter).

The HDD 1 verifies the received digital certificate (701), and accordingly obtains a device class public key KPdc "2" held by the content converter 201. Then, the HDD 1 generate a challenge key Kch which is a temporary key by the key generator 207 (703). The HDD 1 encrypts data in which the generated challenge key Kch is concatenated with its own digital certificate 704 by the device class public key KPdc "2" of the content converter 201 (702), and transmits the encrypted data 705 to the content converter 201.

The content converter 201 that has received the data 705 decrypts the received data 705 by a device class private key Kdc "2" which held in advance, and obtains the challenge key Kch generated by the HDD 1 and the digital certificate of the HDD 1. The content converter 201 verifies the obtained digital certificate (706), and obtains a device class public key KPdc "1" of the HDD 1. The content converter 201 generates a session key Ks0 "2" which is a temporary key by the key generator 204 (707). Then, the content converter 201 dually encrypts data in which the generated session key Ks0 "2" is concatenated with a device public key KPd "2" of the content converter 201 by using the device class public key KPdc "1" of the HDD 1 and the challenge key Kch generated by the HDD 1(708), and transmits the encrypted data to the HDD 1(709).

The HDD 1 decrypts the received data 709 (710) to obtain the device public key KPd "2" of the content converter 201 and the session key Ks0 "2" generated by the content converter 201. The HDD 1 generates a session key Ks0 "1" which is a temporary key by the key generator 207 (711). Then, the HDD 1 dually encrypts the generated session key Ks0 "1" by using the session key Ks0 "2" generated by the content converter 201 and the device public key KPd "2" of the content converter 201 (712), and transmits the encrypted data 713 to the content converter 201.

The content converter 201 decrypts the received data 713 by using the device private key Kd "2" of its own and the session key Ks0 "2" (714) to obtain the session key Ks0 "1" generated by the HDD 1. Then, the content converter 201 generates a session key Ks1 "2" by its own key generator 204. The content converter 201 dually encrypts the session key Ks1 "2" by using the session key Ks0 "1" obtained from the HDD 1 and the session key Ks0 "2" which the content converter 201 has created last time (716), and transmits the encrypted data 717 to the HDD 1.

The HDD 1 decrypts the received data 717 (718) to obtain the session key Ks1 "2". The HDD 1 dually encrypts a license by using the obtained session key Ks1 "2" and the device public key KPd "2" of the content converter 201 (719). Then, the HDD 1 transmits the encrypted data 720 to the content converter 201.

The content converter 201 decrypts the obtained data 720 (721) to obtain a license. Then, the content converter 201 decrypts the encrypted original content by using a content key Kc contained in the obtained license (722). Subsequently, the content converter 201 decodes the decrypted content (723) to obtain a plaintext content. The content converter 201 converts the plaintext content by the converter 203 of the content converter 201 (724) to create a converted content (e.g., standard-definition content). As shown in FIG. 4, a content ID of the created converted content includes a bit flag and an original content ID. The content converter 201 encrypts the converted content again by using the content key Kc (725), and transmits the encrypted data to the HDD 1(726).

The process may be carried out in parallel with recording of the original content by the user, or after reception of an instruction from the user.

When the converted content is taken out from the HDD 1 and moved to another storage medium to be watched, the HDD 1 must generate a converted license through the procedure shown in FIG. 6, and transmit the license to a storage medium of a destination.

Next, an application example of this embodiment will be described.

Digital contents of moving images or music are recorded beforehand in a plurality of file formats in a single removable medium. When this removable medium is connected to a player terminal, the system controller 230 selects a content corresponding to its own processing capacity based on the file format, and decrypts the selected content by using an original license.

Such a removable medium having contents in a plurality of file formats recorded therein may be sold or rented at a rental shop for videos and music. In this case, the user can watch or listen to the contents in all the player terminals equipped with an interface of the removable medium irrespective of whether the file formats correspond to the respective player terminals. In this case, according to this embodiment, the user cannot simultaneously watch or listen to the contents of the plurality of file formats. Hence, copyrights of the contents are protected.

What is claimed is:

1. A storage device for recording contents, the contents comprising a first content and a second content, the storage device comprising:
    a first storage area in which the contents are recorded; and
    a second storage area limited for access, wherein the first storage area records therein a first encrypted content obtained by encrypting the first content by using a predetermined encryption key, and a second encrypted content obtained by encrypting the second content, the second content being generated by executing a predetermined conversion process on the first content, and the second content being encrypted by using the predetermined encryption key used for encrypting the first content,
    wherein the second storage area records therein first license information regarding the first content and the second content,
    wherein the first license information contains first use period information indicating a first use period during which use of one of the first content and the second content is permitted, and a content key for decrypting the first encrypted content and the second encrypted content, and
    wherein the storage device is configured to:
        output the second encrypted content to an external storage medium;
        output second license information containing second use period information indicating a second use period during which use of the second encrypted content output to the external storage medium is permitted, and a content key for decrypting the second encrypted content output to the external storage medium;
        change the first license information so that the second use period during which the use of the second encrypted content output to the external storage medium is permitted is excluded from the first use period during which the use of the one of the first content and the second content stored in the storage device is permitted; and set the second use period during which the use of the second encrypted content output to the external storage medium is permitted such that the second use period does not overlap with the first use period during which the use of the one of the first content and the second content stored in the storage device is permitted.

2. The storage device according to claim 1,
wherein the first content and the second content are identified by content identifiers, the content identifiers comprising a first identifier for the first content and a second identifier for the second content,
wherein conversion information is added to each of the content identifiers,
wherein the second identifier for identifying the second content is equal in value to the first identifier for identifying the first content,
wherein the conversion information added to the second identifier for identifying the second content contains a value indicating whether the second content has been generated by executing the predetermined conversion process,
wherein the storage device obtains a content identifier to which the conversion information has been added and a use period of the content identified by the conversion information of the obtained content identifier,
wherein the storage device determines whether the content identified by the obtained content identifier to which the conversion information has been added is the second content based on the conversion information, and
wherein the storage device generates the second license information when the content identified by the conversion information of the obtained content identifier is determined to be the second content.

3. The storage device according to claim 1,
wherein use of the first content and the second content that are stored in the storage device is not permitted during the use period during which the use of the second encrypted content output to the external storage medium is permitted, and
wherein the use of the one of the first content and the second content that are stored in the storage device is permitted again after the use period during which the use of the second encrypted content output to the external storage medium is permitted.

4. An information processing system for processing contents, the contents comprising a first content and a second content, the information processing system comprising:
a first storage device;
a second storage device; and
a controller, wherein the first storage device includes a first storage area in which the contents are recorded, and a second storage area limited for access,
wherein the first storage area records therein a first encrypted content obtained by encrypting the first content by using a predetermined encryption key, and a second encrypted content obtained by encrypting the second content, the second content being generated by executing a predetermined conversion process on the first content, and the second content being encrypted by using the predetermined encryption key used for encrypting the first content,
wherein the second storage area records therein first license information regarding the first content and the second content, wherein the second storage device records therein the second encrypted content,
wherein the first license information contains first use period information indicating a first use period during which use of one of the first content and the second content is permitted, and a content key for decrypting the first encrypted content and the second encrypted content,
wherein the first storage device is configured to:
output the second encrypted content to an external storage medium;
output second license information containing second use period information indicating a second use period during which use of the second encrypted content output to the external storage medium is permitted, and a content key for decrypting the second encrypted content output to the external storage medium;
change the first license information so that the second use period during which the use of the second encrypted content output to the external storage medium is permitted is excluded from the first use period during which the use of the one of the first content and the second content stored in the first storage device is permitted; and
set the second use period during which the use of the second encrypted content output to the external storage medium is permitted such that the second use period does not overlap with the first use period during which the use of the one of the first content and the second content stored in the first storage device is permitted,
wherein the first storage device transmits the changed first license information to the controller, and the controller transmits the changed first license information to the second storage device.

5. The information processing system according to claim 4,
wherein the first content and the second content are identified by content identifiers, the content identifiers comprising a first identifier for the first content and a second identifier for the second content,
wherein conversion information is added to each of the content identifiers,
wherein the second identifier for identifying the second content is equal in value to the first identifier for identifying the first content,
wherein the conversion information added to the second identifier for identifying the second content contains a value indicating whether the second content has been generated by executing the predetermined conversion process, and
wherein the controller is configured to:
obtain a content identifier to which the conversion information has been added;
determine whether the content identified by the obtained content identifier to which the conversion information has been added is the second content based on the conversion information; and
obtain a use period of the second content when the content identified by the obtained content identifier to which the conversion information has been added is determined to be the second content.

6. The information processing system according to claim 4, further comprising:
a content converter,
wherein the content converter is configured to:
decrypt the first encrypted content by using the predetermined encryption key;

generate the second content by executing the predetermined conversion process on the decrypted first content;

generate the second encrypted content by encrypting the generated second content by using the predetermined encryption key; and output the generated second encryption content to the first storage device.

7. The information processing system according to claim 6, wherein the content converter is configured to:

output a digital certificate recorded in the content converter to the first storage device;

generate a temporary key;

encrypt the generated temporary key to transmit the encrypted temporary key to the first storage device;

obtain a content key encrypted by the first storage device using the generated temporary key; and decrypt the obtained content key by using the generated temporary key, and wherein the predetermined encryption key is the decrypted content key.

8. The information processing system according to claim 4, wherein use of the first content and the second content that are stored in the first storage device is not permitted during the use period during which the use of the second encrypted content output to the external storage medium is permitted, and wherein the use of the one of the first content and the second content that are stored in the first storage device is permitted again after the use period during which the use of the second encrypted content output to the external storage medium is permitted.

9. An information processing terminal, which is connected to a storage device for recording contents, the contents comprising a first content and a second content, the information processing terminal comprising:

a controller, the controller comprising a processor, wherein the storage device records therein a first encrypted content obtained by encrypting the first content by using a predetermined encryption key, a second encrypted content obtained by encrypting the second content, the second content being generated by executing a predetermined conversion process on the first content, and the second content being encrypted by using the predetermined encryption key used for encrypting the first content, wherein the storage device further records therein first license information regarding the first content and the second content, wherein the first license information contains first use period information indicating a first use period during which use of one of the first content and the second content is permitted, and a content key for decrypting the first encrypted content and the second encrypted content, wherein the first content and the second content are identified by content identifiers, the content identifiers comprising a first identifier for the first content and a second identifier for the second content, wherein conversion information is added to each of the content identifiers, wherein the second identifier for identifying the second content is equal in value to the first identifier for identifying the first content, wherein the conversion information added to the second identifier for identifying the second content contains a value indicating whether the second content has been generated by executing the predetermined conversion process, wherein the processor of the controller is configured to:

obtain a content identifier to which the conversion information has been added from an application;

determine whether the content identified by the obtained content identifier to which the conversion information has been added is the second content based on the conversion information;

obtain a use period of the second content via the application when the content identified by the obtained content identifier to which the conversion information has been added is determined to be the second content; and transmit the obtained use period to the storage device, and wherein the storage device is configured to:

output the second encrypted content to an external storage medium;

output second license information containing second use period information indicating a second use period during which use of the second encrypted content output to the external storage medium is permitted, and a content key for decrypting the second encrypted content output to the external storage medium;

change the first license information so that the second use period during which the use of the second encrypted content output to the external storage medium is permitted is excluded from the first use period during which the use of the one of the first content and the second content stored in the storage device is permitted; and set the second use period during which the use of the second encrypted content output to the external storage medium is permitted such that the second use period does not overlap with the first use period during which the use of the one of the first content and the second content stored in the storage device is permitted.

10. The information processing terminal according to claim 9, wherein use of the first content and the second content that are stored in the storage device is not permitted during the use period during which the use of the second encrypted content output to the external storage medium is permitted, and wherein the use of the one of the first content and the second content that are stored in the storage device is permitted again after the use period during which the use of the second encrypted content output to the external storage medium is permitted.

11. A method of controlling an information processing system for processing contents, the contents comprising a first content and a second content, the information processing system comprising: a first storage device; and a controller, the first storage device including a first storage area in which the contents are recorded, and a second storage area limited for access, wherein a first encrypted content obtained by encrypting a first content by using a predetermined encryption key is recorded in the first storage area, wherein a second encrypted content obtained by encrypting a second content, the second content being generated by executing a predetermined conversion process on the first content, and the second content being encrypted by using the predetermined encryption key used for encrypting the first content is recorded in the first storage area, wherein first license information regarding the first content and the second content is recorded in the second storage area, wherein the first license information contains first use period information indicating a first use period during which use of one of the first content and the second content is permitted, and a content key for decrypting the first encrypted content and the second encrypted content, and wherein the method comprises:
 outputting the second encrypted content to an external storage medium;
 outputting second license information containing second use period information indicating a second use period during which use of the second encrypted content output to the external storage medium is permitted, and a content key for decrypting the second encrypted content output to the external storage medium;
 changing the first license information so that the second use period during which the use of the second encrypted content output to the external storage medium is permitted is excluded from the first use period during which the use of the one of the first content and the second content stored in the first storage device is permitted; and
 setting the second use period during which the use of the second encrypted content output to the external storage medium is permitted such that the second use period does not overlap with the first use period during which the use of the one of the first content and the second content stored in the first storage device is permitted.

12. The method according to claim 11,
wherein the first content and the second content are identified by content identifiers, the content identifiers comprising a first identifier for the first content and a second identifier for the second content,
wherein conversion information is added to each of the content identifiers,
wherein the second identifier for identifying the second content is equal in value to the first identifier for identifying the first content,
wherein the conversion information added to the second identifier for identifying the second content contains a value indicating whether the second content has been generated by executing the predetermined conversion process, and
wherein the method further comprises:
obtaining, by the first storage device, a content identifier to which the conversion information has been added and a use period of the content identified by the conversion information of the obtained content identifier from the controller;
determining whether the content identified by the obtained content identifier to which the conversion information has been added is the second content based on the conversion information; and
generating the second license information when the content identified by the conversion information of the obtained content identifier is determined to be the second content.

13. The method according to claim 11, wherein the information processing system further comprises a second storage device in which the second encrypted content is recorded, and wherein the method further comprises:
 transmitting one of the first license information and the second license information transmitted from the first storage device from the controller to the second storage device.

14. The method according to claim 11,
wherein the first content and the second content are identified by content identifiers, the content identifiers comprising a first identifier for the first content and a second identifier for the second content,
wherein conversion information is added to each of the content identifiers,
wherein the second identifier for identifying the second content is equal in value to the first identifier for identifying the first content,
wherein the conversion information added to the second identifier for identifying the second content contains a value indicating whether the second content has been generated by executing the predetermined conversion process, and
wherein the method further comprises:
obtaining a content identifier to which the conversion information has been added;
determining whether the content identified by the obtained content identifier to which the conversion information has been added is the second content based on the conversion information; and
obtaining a use period of the second content when the content identified by the obtained content identifier to which the conversion information has been added is determined to be the second content.

15. The method according to claim 11, further comprising:
decrypting the first encrypted content by using the predetermined encryption key;
generating the second content by executing the predetermined conversion process on the decrypted first content;
generating the second encrypted content by encrypting the generated second content by using the predetermined encryption key; and
recording the generated second content in the first storage area.

16. The method according to claim 15, wherein the information processing system further comprises a content converter, and
wherein the method further comprises:
 transmitting a digital certificate recorded in the content converter from the content converter to the storage device;
 generating a temporary key;
 encrypting the generated temporary key to transmit the encrypted temporary key from the content converter to the storage device;
 obtaining, by the content converter, a content key encrypted by the storage device using the generated temporary key; and
 decrypting the obtained content key by using the generated temporary key, and
wherein the predetermined encryption key is the decrypted content key.

17. The method according to claim 11,
wherein use of the first content and the second content that are stored in the first storage device is not permitted during the use period during which the use of the second encrypted content output to the external storage medium is permitted, and wherein the use of the one of the first content and the second content that are stored in the first storage device is permitted again after the use period during which the use of the second encrypted content output to the external storage medium is permitted.

* * * * *